United States Patent
Trivedi et al.

(10) Patent No.: US 11,993,867 B2
(45) Date of Patent: May 28, 2024

(54) SPUN ABPBI FIBERS AND PROCESS FOR PREPARING THE SAME

(71) Applicant: Gharda Chemicals Limited, Maharashtra (IN)

(72) Inventors: Prakash D. Trivedi, Maharashtra (IN); Mathew Abraham, Maharashtra (IN); Amit Kundu, Maharashtra (IN)

(73) Assignee: GHARDA CHEMICALS LIMITED, Maharashtra (IN)

( * ) Notice: Subject to any disclaimer, the term of this patent is extended or adjusted under 35 U.S.C. 154(b) by 560 days.

(21) Appl. No.: 17/274,935

(22) PCT Filed: Sep. 12, 2019

(86) PCT No.: PCT/IB2019/057697
§ 371 (c)(1),
(2) Date: Mar. 10, 2021

(87) PCT Pub. No.: WO2020/053803
PCT Pub. Date: Mar. 19, 2020

(65) Prior Publication Data
US 2022/0033996 A1 Feb. 3, 2022

(30) Foreign Application Priority Data
Sep. 12, 2018 (IN) .............................. 201821034448

(51) Int. Cl.
*D01D 5/06* (2006.01)
*D01D 10/06* (2006.01)
*D01F 6/74* (2006.01)

(52) U.S. Cl.
CPC ................ *D01F 6/74* (2013.01); *D01D 5/06* (2013.01); *D01D 10/06* (2013.01)

(58) Field of Classification Search
USPC ........................................................ 528/183
See application file for complete search history.

(56) References Cited

U.S. PATENT DOCUMENTS

| | | | |
|---|---|---|---|
| 4,703,103 A | 10/1987 | Wolfe et al. | |
| 4,847,350 A | 7/1989 | Harris | |
| 7,388,035 B2 | 6/2008 | Kim et al. | |
| 2009/0311935 A1 | 12/2009 | Bates, III et al. | |

OTHER PUBLICATIONS

Int'l Search Report dated Nov. 29, 2019 in Int'l Application No. PCT/IB2019/057697.

*Primary Examiner* — Terressa Boykin
(74) *Attorney, Agent, or Firm* — Panitch Schwarze Belisario & Nadel LLP

(57) ABSTRACT

Spun ABPBI fibers and a process for the preparing spun ABPBI fibers using a high molecular weight ABPBI dope solution suitable for spinning are provided. A process for preparing the high molecular weight ABPBI dope solution suitable for spinning is also provided. The spun ABPBI fibers can be used in the preparation of high temperature thermally resistant articles.

17 Claims, No Drawings

SPUN ABPBI FIBERS AND PROCESS FOR PREPARING THE SAME

CROSS-REFERENCE TO RELATED APPLICATIONS

This application is a Section 371 of International Application No. PCT/IB2019/057697, filed Sep. 12, 2019, which was published in the English language on Mar. 19, 2020, under International Publication No. WO 2020/053803 A1, which claims priority under 35 U.S.C. § 119(b) to Indian Application No. 201821034448, filed Sep. 12, 2018, the disclosures of each of which are incorporated herein by reference in their entireties.

FIELD

The present disclosure relates to a process for preparing spun ABPBI fibers and process for preparing the same. The present disclosure further relates to a process for preparation of ABPBI fibers suitable for spinning.

DEFINITIONS

As used in the present disclosure, the following terms are generally intended to have the meaning as set forth below, except to the extent that the context in which they are used indicate otherwise.

The term "ABPBI" as used herein also refers to poly (2, 5-benzimidazole).

The term "tenacity" as used herein refers to the specific stress corresponding to the maximum force on a force/extension curve.

The term "wet spinning" as used herein refers to a process that is based on precipitation, where a polymer solution is drawn through a spinneret into a non-solvent or mixture of non solvent and solvent.

The term "non-solvent" as used herein refers to a substance incapable of dissolving a given component of a solution or mixture.

The term "draw ratio" as used herein refers to a measure of the degree of stretching during the undergoing orientation of the fibres so produced.

The term "initial draw ratio" as used herein refers to a measure of the degree of stretching of the filaments, which occurs between the extrusion orifices and the exit from the coagulation bath. The initial draw ratio is defined as exit velocity divided by jet speed.

The term "heat draw ratio" as used herein refers to a measure of the degree of stretching of the filaments, which occurs in the heat drawing zone.

The term "jet speed" as used herein refers to the speed at which the extruded polymer exits an extrusion orifice.

ACRONYM gmf:—gram force
gpl:—gram per liter

BACKGROUND

The background information herein below relates to the present disclosure but is not necessarily prior art.

Polyimidazoles contain imidazole ring unit in the polymer main chain:

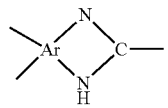

wherein, Ar is an aromatic radical.

These polymers are known to have excellent thermal stability and high melt temperatures.

Poly (2, 2'-(m-phenylene)-5, 5'dibenzimidazole) (PBI) and poly (2, 5-benzimidazole) (ABPBI) are the two polymers broadly covered in the class Polyimidazoles (containing the imidazole ring unit). It is known that polybenzimidazole (PBI) can be synthesized from 3, 3', 4, 4', tetra amino Diphenyl (TADP) and isophthalic acid (IPC) or its phenyl ester. PBI so produced can be spun into fibres that have high temperature resistance.

However, the starting materials used in the aforestated process are expensive and the reagent 4, 4', tetra amino Diphenyl (TADP) is toxic. The molecular weights achieved by this process are not more than 30,000 and the inherent viscosity is also less than 1 dl/gm. The lower molecular weight of the PBI results in lower mechanical properties and lower elongation at break. Poly (2, 5-benzimidazole) (ABPBI) is an aromatic heterocyclic semi-crystalline polymer with excellent thermal and chemical properties. It is synthesized by the self-condensation of 3, 4-diaminobenzoic acid (DABA) in methane sulfonic acid (MSA) or polyphosphoric acid (PPA).

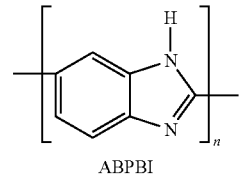

ABPBI

The starting material 3, 4-diaminobenzoic acid (DABA) used in for preparation of ABPBI polymer is less expensive than the monomer TADP that is used in the preparation of PBI. DABA does not have the high toxicity risk in comparison with TADP.

U.S. Pat. No. 7,388,035 suggests a process for producing ABPBI polymer having a higher molecular weight >30,000 and inherent viscosity greater than 1 dl/g by using 3, 4-diaminobenzoic acid (DABA). The higher molecular weight ABPBI produced by the process as disclosed in U.S. Pat. No. 7,388,035 results in higher mechanical properties of fibres. However, the method described for the production of ABPBI, uses a large amount of dehydrating agent i.e., $P_2O_5$ more than equal in weight to reacting monomer, DABA. The amount of $P_2O_5$ used is 1 to 3 moles of $P_2O_5$ per mole of DABA. It is known that the removal of this large amount of dehydrating agent causes further difficulties in downstream processing and recycling and increasing the cost of processing as well.

Juan Antonio Asensio et al, Journal of the Electrochemical Society, 151(2), A304-A310 (2004) and M. Litt, et al, Mat. Res. Soc. Symp. Proc. Vol. 548, Page 313, 1999 discloses the synthesis of ABPBI and its use for fuel cell membranes. However, conventionally prepared ABPBI is not suitable for spinning.

Therefore, there is felt a need for a process to prepare of high molecular weight ABPBI suitable for spinning and produce spun fibers of continuous lengths and comparatively enhanced properties, including high thermal resistance and mechanical strength

OBJECTS

Some of the objects of the present disclosure, which at least one embodiment herein satisfies, are as follows:

It is an object of the present disclosure to ameliorate one or more problems of the prior art or to at least provide a useful alternative.

Another object of the present disclosure is to provide a process for preparing ABPBI suitable for spinning.

Still another object of the present disclosure is to provide a process for preparing ABPBI suitable for spinning that has comparatively higher inherent viscosities.

Yet another object of the present disclosure is to provide a process for the preparation of spun ABPBI fibers.

Another object of the present disclosure is to provide a process for the preparation of spun ABPBI fibers using the ABPBI suitable for spinning.

Still another object of the present disclosure is to provide spun fibers having continuous lengths and comparatively enhanced properties.

Other objects and advantages of the present disclosure will be more apparent from the following description, which is not intended to limit the scope of the present disclosure.

SUMMARY

The present disclosure relates to spun ABPBI fibers characterized by having the properties: filaments in the range of 1.5 denier to 12.0 denier; tenacity in the range of 2.5 grams per denier to 4.0 grams per denier; break strength in the range of 4.0 gmf to 15 gmf; and elongation at break in the range of 15-25%.

The present disclosure further relates to a process for preparing poly (2, 5-benzimidazole) (ABPBI) suitable for spinning to obtain spun ABPBI fibers. The process comprises polymerizing 3, 4-diaminobenzoic acid (DABA) having purity >99.5%, in Methane Sulfonic acid (MSA) at a temperature in the range of 150° C. to 200° C. at a pressure in the range of 0.5 to 10 mm Hg for a time period in the range of 3 to 6 hours to obtain an initial ABPBI dope solution. The pressure of the reaction mixture is released and $P_2O_5$ in the range of 0.05 to 0.3 moles per mole of DABA is added to the reaction mixture and heated at a temperature in the range of 150° C. to 200° C. to obtain ABPBI dope suitable for fiber spinning.

The ABPBI suitable for spinning is further subjected to wet-spinning to obtain spun ABPBI fibers. The process comprises preparing a spinning solution of 2 to 10% by weight of ABPBI in methane sulfonic acid suitable for spinning in a bath having temperatures in the range of 10° C. to 50° C. The spinning solution is extruded through a plurality of extrusion orifices having a diameter in the range of 20 to 200 microns to form a plurality of fibers. The so obtained plurality of fibers is passed through a coagulation bath to obtain coagulated fibers. The coagulated fibers are drawn through a series of one to five baths containing water, with optional alkali added to it, to remove MSA present with an initial draw ratio in the range of 2:1 to 50:1 at room temperature. The fibers are subsequently passed through one or two hot chambers at a temperature in the range of 400° C. to 500° C. to obtain final drawn fibers. The drawn fibres are further washed at room temperature with water and/or organic solvent to remove residual solvent, followed by drying to obtain spun ABPBI fibres. The spun ABPBI fibers can be used in the preparation of high temperature thermally resistant articles like fireman's suits.

DETAILED DESCRIPTION

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, known processes or well known apparatus or structures, and well known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof. The particular order of steps disclosed in the method and process of the present disclosure are not to be construed as necessarily requiring their performance as described or illustrated. It is also to be understood that additional or alternative steps may be employed.

The terms first, second, third, etc., should not be construed to limit the scope of the present disclosure as the aforementioned terms may be only used to distinguish one element, component, region, layer or section from another component, region, layer or section. Terms such as first, second, third, etc., when used herein do not imply a specific sequence or order unless clearly suggested by the present disclosure.

Conventionally, poly (2, 5-benzimidazole) is synthesized as a single step process with the addition of monomer, DABA, to the solvent, methane sulfonic acid and the addition of dehydrating agent $P_2O_5$ in the mole ratio of 1 to 3 moles of $P_2O_5$ per mole of DABA, and then carrying out the polymerization at a high temperature of 150-200° C. for 3-6 hours. The conventional process has the disadvantage of posing the problem of the removal of such a large amount of phosphorous compounds that creates problems in separation. The removal/separation of phosphorous compounds formed during the reaction such as $H_3PO_4$ is tedious and higher costs are involved.

Therefore, the present disclosure envisages a simple and efficient two steps process for synthesis of high molecular weight Poly (2, 5-benzimidazole) suitable for fiber spinning which uses very small quantities of $P_2O_5$. Further, the present disclosure provides a process for preparation of spun ABPBI fibers.

In an aspect of the present disclosure, there is provided spun ABPBI fibers characterized by having the following properties: filaments in the range of 1.5 denier to 12.0 denier; tenacity in the range of 2.5 grams per denier to 4.0 grams per denier; breaking strength in the range of 4.0 gmf to 15.0 gmf; and elongation at break in the range of 15-25%.

In another aspect of the present disclosure, there is provided a process for the preparation of poly (2, 5-benzimidazole) (ABPBI) suitable for spinning that can used in the preparation of spun ABPBI fibers. The process is described in detail herein below:

In the first step, 3, 4 diaminobenzoic acid (DABA) having purity >99.5% and methane sulfonic acid are mixed and the mixture is heated to a temperature in the range of 150° C. to 200° C. at a pressure in the range of 0.5 to 10 mm Hg under inert atmosphere to obtain a reaction mixture. As the temperature rises, DABA dissolves in MSA and the self-condensation polymerization proceeds with the evolution of water. The water is distilled out as a result of high temperature and low pressure.

The reaction mixture is maintained at a temperature in the range of 150° C. to 200° C. and at a pressure in the range of 0.5 to 10 mm Hg for a period of 2-6 hours to obtain a reaction mass. During this 90% amount of water that is generated gets distilled out through azeotropic distillation. Some MSA is also removed along with water.

After 6 hours, vacuum is slowly removed by introducing pure Nitrogen (inert atmosphere) and a dehydrating agent is added to the reaction mass and the polymerization reaction is allowed to go to completion/proceed for another 3-6 hours at 150° C. to 200° C.

In accordance with the present disclosure, the dehydrating agent can be selected from the group consisting of $P_2O_5$ or methane sulfonic anhydride. Typically, the dehydrating agent is $P_2O_5$. The amount of $P_2O_5$ used is in the range of 0.05 to 0.3 moles per mole of DABA. The amount of $P_2O_5$ used is less than one tenth the usages as taught in the conventional processes. The reduction in amount of dehydrating agent in the reaction to such a low level greatly facilitates further purification as well as recycle of the polymerization solvent, MSA, thus making the process practically easily operable and cost effective.

After addition of the dehydrating agent, the reaction mass becomes very viscous and when the FCT is >250 secs at 310° C. and at 1.32% weight by weight (obtained by adding more MSA) as measured by Ford Cup type B4 viscometer, optionally endcapping agent is added and the reaction is further maintained for 1-3 hours. The dope solution is then taken for fiber spinning.

The endcapping agent is selected from the group consisting of benzoic acid, p-phenoxy benzoic acid, and aniline. In an embodiment, the endcapping agent is benzoic acid. The amount of the endcapping agent is in the range of 0.01 to 0.05 moles per mole of DABA.

In an embodiment a sample of the polymerization mass (reaction mass) is drowned into water and the polymer is precipitated out. The so obtained precipitated polymer is extracted with hot water to remove MSA and then dried. The inherent viscosity of the ABPBI polymer obtained by the process of the present disclosure is in the range of 4-5 g/dl, in conc. $H_2SO_4$.

The molecular weight of the ABPBI polymer obtained by the process of the present disclosure is >30,000 and is suitable for spinning and the inherent viscosity of the ABPBI measured in concentrated sulphuric acid is >4.0 dl/g.

In still another aspect of the present disclosure, there is provided a process for the preparation of ABPBI fiber from the so obtained ABPBI which is suitable for spinning. The poly(2,5-benzimidazole) solution in MSA having a FCT, flow time, above 250 secs and more preferably above 300 secs as measured by a Ford Cup type B4 viscometer, at room temperature in the range of 20-40° C. to obtain a dope solution. The concentration of ABPBI polymer in the spinning solution can be in the range of 3-6%. The so obtained dope solution is highly viscous and is used in the spinning process for the preparation of ABPBI fibers.

In accordance with the present disclosure, the ABPBI polymer is provided in the spinning solution having a concentration in the range of 3 to 6% by weight based upon the weight of the total solution. Typically, the ABPBI polymer is provided in the spinning solution having a concentration in the range of 4 to 5% by weight based upon the weight of the total solution. In an exemplary embodiment, spinning solution comprises 4.5-5.0 percent by weight ABPBI polymer and approximately 95-95.5 percent by weight of MSA.

In accordance with the present disclosure, the spinning solution exhibits a viscosity in the range of 20,000 to 60,000 cP measured at 85° C. by a Brookfield viscometer. Typically the viscosity of the spinning solution is in the range of 30000 to 45000 cP.

The spinning solution is extruded through a large number of extrusion orifices. In one embodiment, the extrusion orifices can be in the range of 5-600 holes, preferably from 500 to 600 holes. The diameter of the orifices is in the range of 20 to 200 microns, preferably 30 to 90 microns, and most preferably 60 microns.

In accordance with the present disclosure, the temperature of the spinning solution containing ABPBI polymer and MSA is in the range of 80° C. to 90° C. at the time of extrusion.

The spinning solution is extruded vertically downward into the liquid coagulation bath, comprising a non-solvent. In an embodiment, the spinning solution is placed in a pressure vessel and heated to approximately 85° C. To spin, the solution is fed at 2 psi nitrogen pressure to a metering pump driven by a variable speed AC. motor. The pump speed, and hence the solution flow rate, is maintained constant by an electronic controller. In order to remove the last traces of particulate matter and to ensure uniform distribution of the polymer solution through all the orifices of the spinneret, the solution is passed through a spin pack assembly consisting of a distributor plate, breaker plate, spacer ring, Teflon gasket, stainless steel disc filter of 3 microns just before entering the spinneret.

In one embodiment the liquid coagulation bath consists of a mixture of approximately 0-10% MSA and 90-100% water and more preferably from 7-8% MSA and 92-93% water.

Although a wide range of bath temperatures may be employed, lower temperatures are preferable. Therefore, the bath is preferably maintained at a temperature of 10° C. to 25° C. and more preferably between 15° C. and 20° C.

In an embodiment, the diameter of the extrusion orifices can be in the range of 20-200 microns to form the number of filaments. The solution extruding through these orifices pass through a bath comprising a mixture of MSA and water to obtain coagulated filaments.

A countercurrent flow of water is continuously fed into the coagulation bath to prevent a build-up of MSA, as the spinning progresses, which has been removed from the extruded filaments. The bath composition and bath temperature are generally related to the coagulation rate. It is preferred that the polymer coagulate at such a rate so as to minimize inhomogeneities from the outer surface to the inner core.

The so obtained coagulated filaments are thoroughly washed in a series with water to remove excess MSA.

The so obtain washed coagulated filaments while being passed through the baths, undergo drawing or stretching. The term "draw ratio" is a measure of the degree of stretching undergone during the orientation of the fibres so produced. The term "initial draw ratio" is a measure of the degree of stretching of the filaments, which occurs between the extrusion orifices and the exit from the coagulation bath. The initial draw ratio is defined as exit velocity divided by jet speed. The exit velocity is the speed at which the filaments leave the coagulation bath. The exit velocity is conveniently determined by the surface speed of the rolls, which take up the filaments after their exit from the bath. Thus, the speed of the wash rolls is preferably measured for this purpose.

The jet speed is the speed at which the extruded polymer exits an extrusion orifice. The jet speed is conveniently determined by dividing the total polymer volumetric flow by the total surface area of the extrusion orifices.

In accordance with the present disclosure, the initial draw ratio can be in the range of 1.5:1 to 10:1, typically, the initial draw ratio is in the range of 2:1 to 5:1. In an exemplary embodiment the initial draw ratio is in the range of 2:1 to 2.5:1.

The coagulated fibers leaving the coagulation bath are passed to a washing bath. The continuous length of ABPBI fibres is washed so as to remove at least a major portion of the residual MSA. Typically, a simple water wash is employed; however, if desired, other wash materials such as methanol, ethanol, acetone, methyl ethyl ketone, and similar solvent-miscible and volatile organic solvents as well as alkali like NaOH, $Na_2CO_3$, $NH_3$, and $NH_4OH$ may be used in place of or in combination with the water. However, the preferred wash liquid is water.

The preferred washing bath of the present disclosure comprises a set of skewed rolls, the bottom one of which is partially immersed in the wash liquid. This first wash bath uses water at room temperature to remove the major portion of MSA from the fiber or filament.

After water wash the so obtained ABPBI fibers or filaments are neutralized using an aqueous solution of alkali to neutralize the residual acid, which may not be extracted from the fibers or the filaments by water washing. Any alkali may be used for this purpose, such as sodium hydroxide, potassium hydroxide, ammonium hydroxide etc. In an embodiment, the ABPBI filaments are passed to a neutralization bath where the fibers or filaments are passed into a dilute aqueous sodium hydroxide solution having a concentration of sodium hydroxide in the range of 2-10 gpl, preferably 3-4 gpl. The temperature of the washing liquid is maintained at 50-60° C.

From the neutralization bath the fibers or filaments are passed to a hot water bath for final washing. In one embodiment the temperature of the hot water bath can be in the range of 80° C. to 95° C. Typically the temperature of the hot water bath is 90° C.

The so obtained washed and dried fibers contain less than about 2 percent by weight MSA based on the weight of the continuous filamentary material. In an exemplary embodiment, the so obtained washed and dried fibers contain less than about 1 percent MSA by weight.

From the washing baths the fibers or filaments are passed to a drying zone where it undergoes hot drawing. The manner in which heat is applied to the polybenzimidazole fiber may be varied. In one embodiment, the fiber may be heated via radiation heating or by passage through a muffle furnace or other hot gas heating zone. In another embodiment, the polybenzimidazole fiber undergoing hot drawing may be heated via conductive heating, wherein the fiber is passed over a hot surface, such as one or more hot shoes, rolls, plates, pins, etc.

The combination of the spin line tension and the muffle furnace temperature causes the filaments to elongate. Due to this, the polymeric structure within the filaments becomes somewhat better organized.

In accordance with the present disclosure the filaments are preferably dried by passing them between a set of heated plates kept at a high temperature of 400° C.-500° C. and more preferably 400° C.-450° C. The first heated plate is kept at 400° C. and the second heated plate is kept at 450° C. Sufficient length of the heater plate is provided to ensure that the fibre or filament has sufficient residence time to attain the temperature of the heater plate.

The tension on the filaments is maintained so that the heat draw ratio is approximately 1.5:1 to 10:1. A heat draw ratio of approximately 2:1 to 6:1 is preferred, and a heat draw ratio of approximately 2:1 to 3:1 is most preferred.

The heat draw ratio is a measure of the degree of stretching of the filaments, which occurs in the heat drawing zone. In accordance with the present disclosure, the draw ratio is obtained by taking the ratio of the surface speed of a take-up roll at the exit end of the drawing zone to the surface speed of a feed or supply roll at the entrance end of the drawing zone. Preferably, the heat draw ratio is determined by the relative speeds of the set of exit rolls and the set of drying rolls, which serve as feed rolls to the drawing zone.

The drawn filaments are collected by conventional means. A preferred apparatus is assembled from an AC motor, the speed of which can be precisely controlled, and a transverse winder.

The physical properties of the filaments produced by the inventive process are measured by standard ASTM test methods. The filaments have a denier per filament in the range of 1-3; preferably denier per filament is 1 to 2. The filaments have a tenacity of at least 3-5 grams per denier and more preferably tenacity of 4 to 5 grams per denier. The fibers or filaments have 5 to 20 percent elongation.

The ABPBI fibers or filaments thus produced have a variety of applications due to their superior durability and high heat resistance property.

ABPBI (2, 5 polybenzimidazole) is resistant to combustion, chemicals, and radiation, and has a property of low, relatively non-toxic smoke generation, ABPBI yarns are useful for weight-critical applications in hostile or hazardous environments. Its major application is likely to be part of Fireman's Suits, usually along with Kevlar. Other applications include insulating pads or mats and high-strength, light-weight, non-flammable articles made from fibres. Especially such ABPBI fibers are used in aerospace, where fire hazards need to be nearly zero. In such articles, ABPBI filaments may be used as a replacement for mineral fibers, such as fiberglass.

In an embodiment the process for preparation of filaments/fibers by using wet spinning of the ABPBI is described below. The wet spinning process comprises following steps:

1. Coagulation
2. Drawing and Neutralizing
3. Water washing
4. Drying and heat treatment
5. Finish application
6. Drying
7. Crimping
8. Chilling
9. Cutting
10. Packaging 1. Coagulation: Degassed hot dope solution (which is ABPBI in Methane Sulphonic Acid (MSA) of concentration in the range of 3 to 6% by weight based upon the weight of the total solution, and preferably in a concentration of 4 to 5 percent by weight based upon the weight of the total solution) is extruded. The ABPBI has an inherent viscosity (IV) of 4.0-5 dl/gm. The solution has a viscosity about 20000 to 60000 cP measured at 85° C., and most preferably a viscosity of about 30000 to 45000 cP measured at 85° C. as measured by a Brookfield viscometer. This dope solution is provided in the temperature range of 80-90° C. and is extruded through spinnerets by pumps which have number of holes (orifices) 500-600 for filament yarn and each hole having a diameter of 20 to 200 microns, preferably of approximately 30 to 90 microns, and most preferably of approximately 60 microns in diameter into a coagulation bath. This bath consists of a mixture of approximately 0-10 percent MSA and 90-100 percent water and more preferably from 7-8% MSA and 92-93% water in a low temperature range from about 15 to 20° C. The polymer will coagulate and form yarn (tow).

2. Drawing and Neutralizing: For the first stage in drawing, the tow is passed through baths having water in the temperature range from 25 to 40° C. and preferably at a temperature in the range of 25 to 30° C. The draw ratio can be in the range of 1.5:1 to 10:1. In one embodiment, the initial draw ratio is 2:1 to 5:1, and, most preferably 2:1 to 2.5:1.

In the $2^{nd}$ stage, the tow is passed through baths having alkali preferably NaOH, $NH_4OH$ or KOH in the temperature range from about 25 to 80° C., preferably 40 to 60° C. with a draw ratio from about 1.05:1 to 2.5:1, preferably 1.5:1 to 2.2:1. In this stage most of MSA solvent is removed from the tow.

3. Water Washing: In this stage, remaining solvent is removed by water wash in the temperature range from 80 to 100° C., preferably 90° C.

4. Drying and Heat Treatment: The tow is passed through number of heated rollers in the temperature range from 100-150° C. to dry the tow to a moisture level from about 2 to 12%, preferably 4 to 8%. Further, the tow is passed in between single or multi stage hot plates at a temperature in the range of 400° C. to 500° C., preferably 390° C. to 480° C. with a draw ratio from 1.5:1 to 10:1. A heat draw ratio of approximately 2:1 to 6:1 is preferred, and a heat draw ratio of approximately 2:1 to 3:1 is most preferred.

5. Finish application: The tow is passed through a bath of water having spin finish having a temperature in the range of 20-60° C., preferably 25° C. to 50° C. The spin finish contains lubricant and anti-static agents for ease of further spinning process and to avoid static electricity generation on the fibers respectively.

6. Drying: The tow is passed through a number of heated rollers again having a temperature in the range of 100-150° C. to dry the tow to a moisture level of from about 2 to 12%, preferably from about 4 to 8%. 7. Crimping: The tow is crimped, as required for making staple fibers, by passing through a crimper at a temperature in the range 275-500° C., preferably in the range of 375 to 480° C.

8. Chilling: The heated tow is then cooled down to 20-50° C. by chilled air.

9. Cutting: The tow is be cut, for staple fibers, to needed desired length (38/51/76/85 mm) depending upon the denier and customer requirement.

10. Packaging: The filament yarn is wound as a bobbin (2.0-10.0 kg) whereas staple fibre is packed as a bale (100 kg).

The present disclosure is further described in light of the following experiments which are set forth for illustration purpose only and not to be construed for limiting the scope of the disclosure. The following experiments can be scaled up to industrial/commercial scale and the results obtained can be extrapolated to industrial scale.

EXPERIMENTAL DETAILS

Experiment 1

Preparation of ABPBI Suitable for Spinning in Accordance with the Process of the Present Disclosure:

2909 gms of Methane Sulfonic Acid of purity 99% were charged in a 5 L flanged stirred Glass Reactor immersed in an oil bath and under an inert Nitrogen atmosphere under stirring.

456 gms of 3, 4 diamino benzoic acid were added to Methane Sulfonic Acid to obtain a mixture. The mixture was heated to 160° C. at a pressure of 1 mm Hg for 5 hours continuously. The distillation was carried out to remove water from the reaction along with some MSA also getting distilled over. After 5 hours, a stream of high purity Nitrogen was passed to the reactor to break vacuum. A sample of about 200 ml of reaction mass is taken out and Ford Cup Time (FCT) was checked using a Ford Cup Type B4 viscometer. FCT was 80 secs.

43 gms of Phosphorus Pentoxide ($P_2O_5$) of purity 99% (0.1 mole/mole of DABA) was then added to the reaction mixture at 160° C. The temperature was maintained for further 5 hours under inert Nitrogen atmosphere. Optionally, vacuum may also be applied to the reactor. After 5 hours, FCT increased to 280 secs. Thereafter, 7.4 Gms of Benzoic acid of purity 99% was added as endcapping agent and reaction was further maintained for 2 hours. The polymer solution was cooled to 100° C. and the solution is shifted to a storage container with nitrogen blanketing and maintained for further spinning.

The inherent viscosity of the polymer in concentrated sulfuric acid was found to be 4.2 dl/gm.

Experiment 2

Experiment 1 was repeated except 7200 gms MSA and 129 gms (0.3 moles/mole of DABA) $P_2O_5$ was charged in the reactor. The polymer solution had FCT of 300 sec and inherent viscosity of 4.5 dl/gm.

Experiment 3

Experiment 1 was repeated except 7200 gms MSA was charged under 0.5 mm Hg pressure and 150° C. temperature during the first stage. During the second stage $P_2O_5$ charged was 129 gms (0.3 moles/mole of DABA). The polymer solution had and FCT of 290 sec and inherent viscosity of 4.4 dl/gm.

Experiment 4

Experiment 1 was repeated except MSA charged was 7200 gms and the polymerization was carried out at the pressure 10 mm Hg and temperature 200° C. during the first stage. During the second stage $P_2O_5$ charged was 43 gms (0.1 moles/mole of DABA). The polymer solution had and FCT of 330 sec and inherent viscosity of 5.0 dl/gm Experiment 5

Preparation of Spun ABPBI Fibers:

2 kg dope solution containing 4% ABPBI polymer (of inherent viscosity 4.3 dl/g) and 96% Methane Sulphonic Acid with a viscosity of 30000 cP at 80° C. was poured in a tank of 5 liter capacity after passed through 3 stage filter of 400 and 625 mesh size under agitation. Material passed through a 100 holes spinneret assembly with individual hole diameter of 0.2 mm fitted with specially designed spin pack by a metering pump and coagulated in mixture of MSA+water at 20-30° C. and formed filaments (tow). Subsequently filaments were stretched by passed through godet rollers at different rpm, simultaneously solvent were removed by passing through alkali and hot water baths. Separate multiple hot washing was given to remove last traces of solvent. Filaments were heat set and wound in a bobbin.

Experiment 6

Above procedure in Experiment 5 was followed except using spinneret, where the number holes were 250 of individual diameter 0.1 mm.

Experiment 7

Above procedure in Experiment 5 was followed except using spinneret, where the number holes were 650 of individual diameter 0.06 mm.

TABLE 1

Properties of filaments

| Property | Experiment - 5 | Experiment - 6 | Experiment - 7 |
|---|---|---|---|
| DPF (denier per filament) | 10 | 3.5 | 1.5 |
| Tenacity (gm/denier) | 1.5 | 2.0 | 4.0 |
| Elongation, % | 25 | 20 | 15 |

As the number of holes is increased, the diameter of fibers gets reduced as seen by reduction in Denier of single fiber. This also increases tenacity.

The Experiments 8-10 illustrate the continuous production of spun ABPBI fiber by wet spinning process similar to above experiment 5 except concentration of dope solution was 5%, but the metering pump speed was varied.

Experiment 8

Metering pump speed: 20 rpm
Spinneret used: 250 Holes, Hole Diameter: 100 micron
Dope Temperature: 85° C.,
The fiber so obtained exhibited the following characteristics:
Filaments: 8.9 denier
Tenacity: 1.58 grams per denier,
Break Strength: 14.1 gm Force
Elongation at Break: 146.5%

Experiment 9

Metering pump speed 15 rpm
The fiber exhibited the following characteristics:
Filaments: 6.6 denier
Tenacity: 1.32 grams per denier,
Break Strength: 8.7 gm Force
Elongation at Break: 64.2%

Experiment 10

Metering Pump speed: 10 rpm
The fiber exhibited the following characteristics:
Filaments: 6.4 denier
Tenacity: 1.63 grams per denier,
Break Strength: 10.4 gm Force
Elongation at Break: 70.3%

Experiments 11-14 illustrate the continuous production of ABPBI fiber by wet spinning process similar to above experiment 5 except concentration of dope solution was 4.5%, and inherent viscosity of the ABPBI used for the dope solution was varied.

Experiment 11

Inherent Viscosity of ABPBI used for dope solution is 4.3 dl/g
Concentration of polymer which is used here 4.5%
The fiber exhibited the following characteristics:
Filaments: 3.8 denier
Tenacity: 1.30 grams per denier,
Break Strength: 4.9 gm Force
Elongation at Break: 48.9%

Experiment 12

I. V.: 4.46 dl/gm
ABPBI Polymer concentration: 4.5%
Spinneret used: 650 holes, hole diameter: 60 micron
Dope temperature: 85° C.
Metering pump speed 16 rpm
The fiber exhibited the following characteristics:
Filaments: 3.13 denier
Tenacity: 1.70 grams per denier,
Break Strength: 5.31 gm Force
Elongation at Break: 16.8%

Experiment 13

I.V. 4.6 dl/gm
ABPBI Polymer concentration: 4.5%
The fiber exhibited the following characteristics:
Filaments: 2.7 denier
Tenacity: 4.17 grams per denier,
Break Strength: 11.2 gm Force
Elongation at Break: 14.1%

Experiment 14

I.V. 5.15 dl/gm
ABPBI Polymer concentration: 4.5%
Metering pump speed 16 rpm
The fiber exhibited the following characteristics:
Filaments: 1.88 denier
Tenacity: 4.8 grams per denier,
Break Strength: 9.02 gm Force
Elongation at Break: 12.3%

As the inherent viscosity is increased, the DPF reduces and tenacity increases.

Comparative Properties of ABPBI and PBI Fiber:
Comparative Properties of ABPBI Fiber Obtained in Accordance with the Present Disclosure and Commercial PBI Fiber:

| Property | Unit | ABPBI fiber obtained by the process in accordance with the present disclosure | PBI fiber (conventional) |
|---|---|---|---|
| Density | Gm/cc | 1.4 | 1.4 |
| Denier | | 1.5 | 1.5 |
| Tenacity | Gm/denier | 4.0 | 2.7 |
| Elongation | % | 10-15 | 25 |
| Spin Finish | % | 0.35 | 0.35 |
| LOI | % | 90 | ≥ 41 |
| Moisture Regain | % | 25 | 15 |
| Cross Section | | Circular | Bean Shaped |
| Color | | Dark reddish (Natural) | Golden-Brown (Natural) |

ABPBI fiber is better than PBI fiber because of higher Limiting Oxygen Index (LOI) which requires more oxygen to burn, Thermo Gravimetric Analysis (TGA) of the fiber is showing outstanding thermal stability (residue is 50% at 1000° C.) and higher moisture regain which provides wear comfort. The ABPBI fiber obtained in accordance with the process of the present disclosure can be blended with cotton, viscose, Meta aramid, para aramid, easily to meet various requirements.

TECHNICAL ADVANCEMENTS

The present disclosure described herein above has several technical advantages including, but not limited to, the realization of a process for preparation of ABPBI using low amounts of dehydrating agent, which facilitates the downstream process, thus making the entire process cost effective. The present disclosure further relates to process for preparation of filaments/fibers by wet spinning of the ABPBI (Poly 2, 5 Benzimidazole), which can be used in the preparation of high temperature thermally resistant articles.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" or "a" suggests the use of one or more elements or ingredients or quantities, as the use may be in the embodiment of the invention to achieve one or more of the desired objects or results. While certain embodiments of the inventions have been described, these embodiments have been presented by way of example only, and are not intended to limit the scope of the inventions. Variations or modifications to the formulation of this invention, within the scope of the invention, may occur to those skilled in the art upon reviewing the disclosure herein. Such variations or modifications are well within the spirit of this invention.

The numerical values given for various physical parameters, dimensions, and quantities are only approximate values and it is envisaged that the values higher than the numerical value assigned to the physical parameters, dimensions and quantities fall within the scope of the invention unless there is a statement in the specification to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. Spun ABPBI fibers, wherein the spun ABPBI fibers have the following properties:
   a. filaments in the range of 1.5 denier 12.0 denier;
   b. tenacity in the range of 2.5 grams per denier to 4.0 grams per denier;
   c. break strength in the range of 4.0 gmf to 15 gmf; and
   d. elongation at break in the range of 15-25%.

2. A process for preparing poly(2,5-benzimidazole) (ABPBI) suitable for spinning, said process comprising the following steps:
   i. polymerizing 3,4-diaminobenzoic acid (DABA) having purity >99.5% in Methane Sulfonic acid (MSA) at a temperature in the range of 150° C. to 200° C. at a pressure in the range of 0.5 to 10 mm Hg for a time period in the range of 3 hours to 6 hours under inert atmosphere to obtain a reaction mixture; and
   ii. adding $P_2O_5$ in the range of 0.05 to 0.3 moles per mole of DABA to said reaction mixture at a temperature in the range of 150° C. to 200° C. for a time period in the range of 3 hours to 6 hours under inert atmosphere to obtain ABPBI suitable for spinning.

3. The process as claimed in claim 2, wherein 70 to 90% water and MSA are removed through azeotropic distillation during polymerization in step i).

4. The process as claimed in claim 2, wherein the inherent viscosity of said ABPBI in concentrated sulfuric acid is >4 dl/g.

5. The process as claimed in claim 2, wherein an endcapping agent is optionally added in step ii).

6. The process as claimed in claim 5, wherein said endcapping agent is benzoic acid.

7. A process for preparing spun ABPBI fibers, said process comprising the following steps:
   (a) preparing a spinning solution comprising 2 to 10% by weight of ABPBI suitable for spinning as claimed in claim 2 and methane sulfonic acid in a bath having temperature in the range of 80° C. to 90° C.;
   (b) extruding said spinning solution through a plurality of extrusion orifices having a diameter in the range of 20 to 200 microns to form a plurality of fibers;
   (c) passing said filaments through a coagulation bath to obtain coagulated fibers;
   (d) drawing said coagulated fibers with an initial draw ratio in the range of 2:1 to 50:1 at a temperature in the range of 400° to 500° C. to obtain drawn fibers; and
   (e) washing said drawn fibers obtained in step d) to remove residual non-solvent, followed by drying to obtain ABPBI fibres.

8. The process as claimed in claim 7, wherein said fibers are drawn through a drawing zone at a heat draw ratio in the range of 1.5:1 to 10:1 to obtain filaments having a denier per filament in the range of 0.05 to 0.5 and a tenacity of at least 4 grams per denier.

9. The process as claimed in claim 8, wherein said heat draw ratio is in the range of 2:1 to 6:1, preferably in the range of 2:1 to 3:1.

10. The process as claimed in claim 7, wherein said extrusion orifices are situated at a distance in the range of 1 inch to 10 inches above said coagulation bath.

11. The process as claimed in claim 7, wherein in step (b) said spinning solution is extruded at a temperature in the range of 80° C. to 90° C.

12. The process as claimed in claim 7, wherein in step (b) said plurality of extrusion orifices are in the range of 30 to 90 microns.

13. The process as claimed in claim 7, wherein in step (c) said coagulation bath is maintained at a temperature in the range of 10° C. to 25° C., preferably in the range of 15° C. and 20° C.

14. The process as claimed in claim 7, wherein in step (d) the initial draw ratio is in the range of 1.5:1 to 10:1, preferably in the range of 2:1 to 5:1.

15. The process as claimed in claim 7, wherein in step (e) said fibers are washed with water at a temperature of in the range of 50° C. to 60° C.

16. The process as claimed in claim 7, wherein in step (e) said fibers are dried while passing through said drying zone at a temperature in the range of 400° C. to 450° C.

17. The process as claimed in claim 2, wherein the poly(2,5-benzimidazole) (ABPBI) suitable for spinning to obtain spun fibers, wherein the spun ABPBI fibers have the following properties:
 a. filaments in the range of 1.5 denier to 12.0 denier;
 b. tenacity in the range of 2.5 grams per denier to 4.0 grams per denier;
 c. break strength in the range of 4.0 gmf to 15 gmf; and
 d. elongation at break in the range of 15-25%.

\* \* \* \* \*